Figure 1:
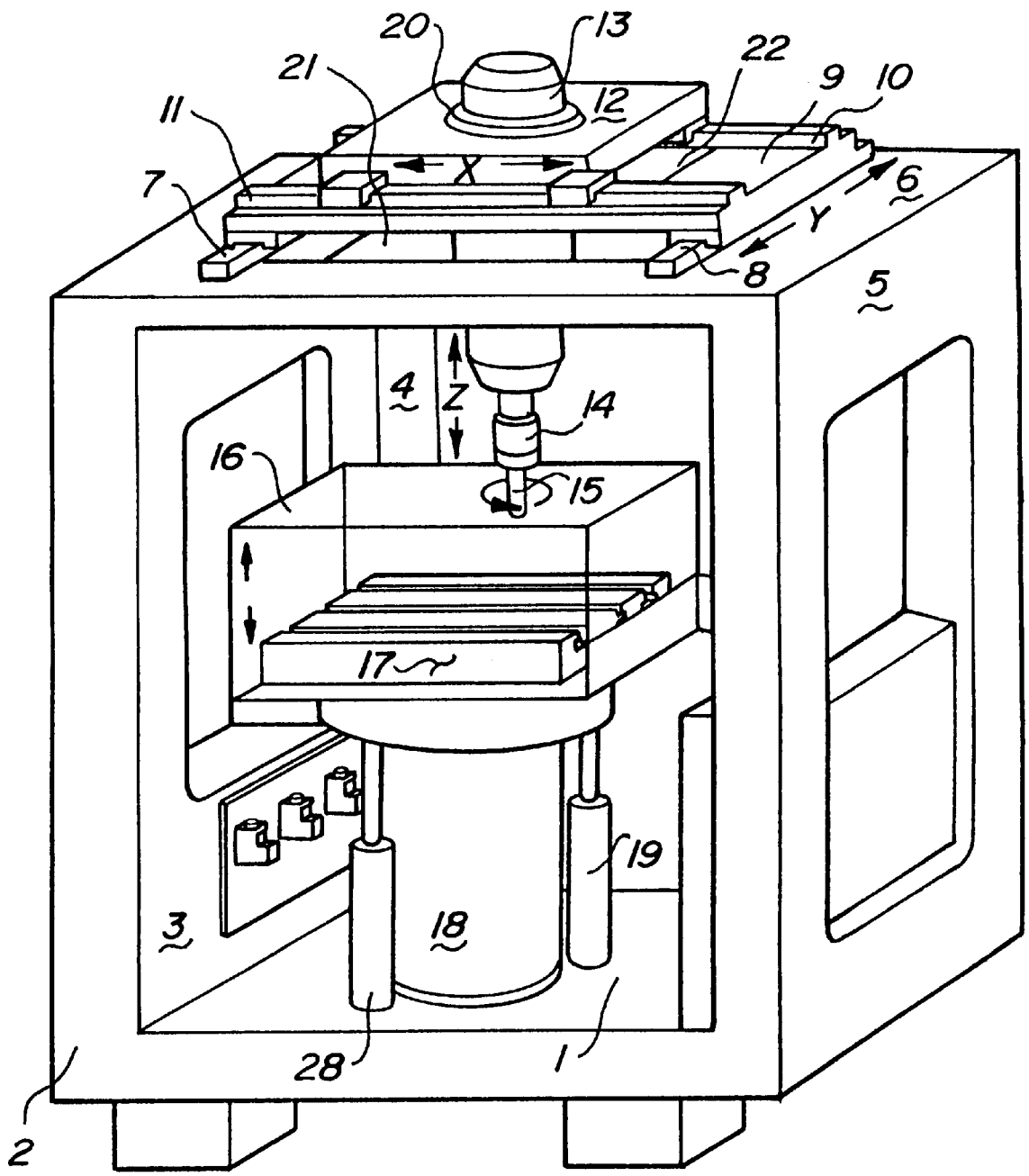

United States Patent [19]
Girardin

[11] Patent Number: 5,911,888
[45] Date of Patent: Jun. 15, 1999

[54] STRUCTURE FOR EDM MACHINE

[75] Inventor: Roger Girardin, Vernier, Switzerland

[73] Assignee: Charmilles Technologies S.A., Switzerland

[21] Appl. No.: 08/724,035

[22] Filed: Sep. 23, 1994

Related U.S. Application Data

[63] Continuation of application No. 08/304,795, Sep. 12, 1994, abandoned.

[30] Foreign Application Priority Data

Sep. 10, 1993 [CH] Switzerland ............... 02 715/93

[51] Int. Cl.$^6$ ........................................... B23H 1/00
[52] U.S. Cl. ........................................... 219/69.11
[58] Field of Search .................... 219/69.1, 69.11, 219/68, 69.14, 69.15, 69.2

[56] References Cited

U.S. PATENT DOCUMENTS

| | | | |
|---|---|---|---|
| 4,755,651 | 7/1988 | Tsutsui | 219/69.14 |
| 5,270,512 | 12/1993 | Onandia | 219/69.11 |
| 5,293,022 | 3/1994 | Onandia-Alberdi | 219/69.11 |

FOREIGN PATENT DOCUMENTS

| | | | |
|---|---|---|---|
| 1540697 | 5/1969 | Germany | 219/69.11 |
| 62-4524 | 1/1987 | Japan | 219/69.11 |
| 1-170533 | 7/1989 | Japan | 219/69.14 |
| 2169835 | 7/1986 | United Kingdom | 219/68 |

*Primary Examiner*—Geoffrey S. Evans
*Attorney, Agent, or Firm*—Gifford, Krass, Groh, Sprinkle, Patmore, Anderson & Citkowski,P.C.

[57] ABSTRACT

An electric discharge machine allows machining of a stationary workpiece by a device for moving the machining head and therefore the electrode vertically along the Z axis, a first chariot sliding along one of the X and Y axes, mounted on a cross beam resting on two shoulders laid out on both sides of the work zone, and cut out at the center to allow a shaft fixed to the device for moving the machining head to pass through. A second chariot slides along the other of the X and Y axes. The workpiece is supported by a worktable is supported by a column that is movable by a pair of fluid actuators. The fluid actuators may be powered hydraulically or pneumatically.

11 Claims, 2 Drawing Sheets

STRUCTURE FOR EDM MACHINE

This is a continuation of application Ser. No, 08/304,795 filed Sep. 12, 1994, now abandoned, and Switzerland Application 02 715/93-2 filed Sep. 10, 1993.

This invention concerns the structure of an electrical discharge machining (EDM) machine, in particular an EDM milling machine. This technique consists of the following: a three-dimensional cavity or solid form is machined by hollowing out the workpiece-electrode, preferably at high speed, with a rotary tool-electrode, of a shape that is simple and independent of the desired contour. This saves the fastidious work of designing and making electrodes of complex shapes. It is possible to proceed by successive slices and by compensating the wear of the tool-electrode according to the method described in application (E. 224) or EP 555 818 by the applicant. Machining is done with a high wear rate, in which the length of the tool-electrode of simple shape goes down rapidly, but without any apparent lateral wear. The geometry of the three-dimensional volume to be hollowed out has been memorized in the form of a set of virtually parallel superimposed layers (or slices). The active end of the tool-electrode makes reciprocal or other movements in the plane of each of these slices, so as to erode them successively down to the bottom of the cavity to be machined. The active end advances along a plane tool path called "at zero wear", whose X and Y axis coordinates have also been memorized.

As in EDM die sinking, contouring or drilling, the tool is gripped in a tool holder locked on to a rotary machining head that is mobile along the Z axis, while the workpiece is placed on and clamped to a work table stationary or not in relation to the main frame of the machine. The relative movement (X, Y movement) between the machining head (and the tool) and the workpiece is obtained in general thanks to a system of crossed movements.

EDM machines known at present have a wide range of variants:

the head is stationary in relation to the ,x and Y axes and the assembly that moves is the workpiece and its work table, mounted on a system having crossed movements along the X and Y axes;

the workpiece and its work table are stationary and it is the unit that is mobile along the Z axis, on which is fixed the machining head and the components providing tool rotation, which is actuated by a system having crossed movements along the X and Y axes;

the head moves for example along the X axis, along the pediment of a gantry mounted on the base, on both sides of the working area; it is the gantry or the workpiece and its work table which moves along the Y axis. Most EDM machines are now equipped with a numerical control unit that controls the advance along Z of the machining head and also the relative movement along X, Y between the tool and the workpiece.

But, contrary to conventional die sinking, EDM milling is generally carried out with a current of very high density (sometimes one or several hundred amperes/cm2), and with very high rotation speeds of the tool-electrode (one or several thousand r.p.m). On the other hand, the tool is generally a small-diameter cylinder that can be hollow, so it is very light compared to the tools normally used in conventional die sinking. Moreover, the active end of the tool-electrode moves with a reciprocating or spiral movement in the plane of each of the eroded layers, hence with sudden changes of direction. Finally, to be able to machine without apparent lateral wear, a very high rate of wear is used (for example 20 to 50%); advance speeds along the tool paths are much higher than in planetary die sinking or contouring, for instance; they can be around 10 mm/sec. It should also be noted that the heat given off is greater.

The constraints are therefore not the same as in conventional die sinking and may sometimes be more like those found in EDM wire cutting or drilling.

The purpose of this invention was to find a layout of the X, Y and Z axes better adapted to this new type of constraints compared to the structures known at present, in particular having as little weight to move as possible and the greatest possible symmetry, and avoiding all overhang. This invention was developed by the applicant in connection with EDM milling by layers, but can also very advantageously be used for other types of machining where there is a need for a good mastery of tool movements, stability and compactness of the main frame and good accessibility of the machining area.

This required the choice of a structure with the following characteristics:

with stationary workpiece (so that no chariot or slide having cross movements along the X and Y axes is moving while supporting the mass of a tank full of dielectric and a workpiece of possibly great weight;

of gantry type, so as to limit overhang, as it is well known to the man skilled in the art, that gantry construction is more rigid, more stable and less affected by vibrations than a C type structure. Here it is worth pointing out that EDM machines known at present are of two structural types: column (or "C") and gantry. In both cases the main frame has a base that supports the work tank.

In the C structure, a vertical column is fixed rigidly to this base, and a console is mounted with overhang on this column. The console carries the chariot which is mobile along Z and on which is fixed the machining head and the components providing rotation of the tool. The cross-slide systems along the X and Y axes generally rests on the base, under the work tank (it is the workpiece which is mobile); this system can also be incorporated into the column (only the machining head is mobile) either at the end of the mobile chariot holding the machining head or at the point where it is attached to the column.

In the gantry structure, two columns or shoulders rise on both sides of the base and are rigidly fixed to a cross beam on which is mounted the chariot mobile along Z, on which the machining head and the components providing rotation of the tool are fixed, the latter being placed over the machining area and the work tank. In general this chariot is also mobile along the cross beam, along the X axis,. Either the workpiece or the gantry is mobile along the Y axis, so as to bring the workpiece under the machining head.

Contrary to the tradition followed to date in EDM, whether in the case of column or gantry structures, in which the console carrying the chariot mobile along Z on which is fixed the machining head and the components actuating tool rotation, is either fixed, or mounted at the end of one of the chariots mobile horizontally along the X and Y axes, the purpose of this invention is a new structure, in which the device actuating the machining head vertically along the Z axis traverses at least one of these chariots. The assembly comprising this device and the chariot it traverses is mounted "on the roof of the machine main frame", above a cross beam that is overhead of the work area and mounted on at least two shoulders located on either side of this area.

Thus the device actuating the machining head vertically along the Z axis is mounted symmetrically in relation to the points of support of the cross beam; this remains true if the main frame is shaped as a cube, as described in the parallel patent application (E. 228 B); the cross beam is then in reality the upper face of the cube and the device is mounted symmetrically in relation to the four points of support of the cross beam, formed by the edges of the cube. A machine having such a symmetrical structure has better resistance to thermal distortions; if they do occur they are symmetrical and thus less likely to affect accuracy; furthermore, since at least two of the mechanisms actuating the machining head along the three reference axes X, Y, and Z are laid out "on the roof" of the main frame and hence far from the machining area, they are much less affected by the heat given off in the area.

All overhang is avoided; the machine absorbs better the vibrations caused by the high rotation speed of the electrode; accuracy and reliability of machining are improved, as is user comfort, since noise is virtually eliminated, despite the high rotation speeds used.

The fact that the workpiece and the tank are fixed eliminates all problems of dielectric overflowing from the work tank when there are rapid relative movements and above all accelerations along X, Y, which are usual in EDM milling. But above all, as for every machine with a fixed workpiece, machining accuracy and reproducibility is practically independent of the workpiece dimensions and weight.

The structure according to this invention, particularly through the reduction of weights in movement and moments of inertia, above all allows the following:

obtention of the dynamic forces required for very fast movements, decelerations and accelerations or even sudden stoppages which are frequent during sweeping paths that are usual in milling; a variant in which ceramics are used for the system with crossed X and Y movements enables these performances to be increased while reducing even further the masses in movement;

better positioning accuracy.

It should also be added that a structure according to this invention with at least two of the mechanisms actuating the machining head along the three reference axes X, Y, and Z laid out "on the roof" of the main frame, frees the zones around the machining area; the machine is thus much more compact and has a more accessible machining area, since at least two sides are completely clear, thanks to the high position of the X and Y movements which are frequently bulky.

Another advantage is that the movements along X and Y are not limited by any lateral obstacle.

The structure according to this invention has a particularly advantageous variant, in which the Z movement mechanism crosses the two X and Y movement chariots laid out on the cross beam; the Z axis is thus passing at the center of symmetry of one of these chariots, while it always maintains a point in common with the other axis. This arrangement further strengthens the symmetry of the machine, and above all reduces to the maximum the moments of inertia along the axes of movement, thus enhancing the advantages already mentioned above.

In the following, the invention is described in greater detail by means of the drawing representing two of the forms of execution, given as non exhaustive examples. The machine thus represented can receive any modifications of form and detail without departing from the spirit of the invention.

FIG. 1 is a simplified perspective view of the front face and one side of the main frame of a machine according to this invention; this main frame is in the shape of a cube. Its base 1 is constituted by the lower face of this cube. The four sides 2 and 5 each made up of one of the lateral faces of this cube are cut out to a large extent while retaining, along the edges of the cube, four pillars on which the upper face 6 rests.

The upper face 6 has two rails 7 and 8 on which the chariot 9 slides, corresponding to the movement along the Y axis. This chariot 9 has two rails 10 and 11 on which the chariot 12 slides, corresponding to the movement along the X axis. This chariot 12 has a circle cut out and comprises the means 20 for holding the cylindrical shaft 13 of the movement along the Z axis. The face 6 and the chariot 9 both have a space, 21 and 22 respectively, suitably cut out to allow this shaft 13 to move freely along X and Y, following the movements of these chariots 9 and 12. These rails 7, 8, 10 and 11 are preferably prestressed, serving to guide the movement of slides of known type, mounted on the lower face of the chariots 9 and 12. These rails and slides are of great rigidity and allow accurate and reproducible machining.

A bellows (not shown) isolates the rotating spindle, mounted in the shaft 13, and therefore not visible in the drawing, from the machining liquid sprayed from the machining head to cool the machining area and evacuate the debris of EDM machining, and also the vapors and fumes rising from the machining bath. This shaft 13 also contains the machining head and the components of the Z axis (of known type, causing the upper machining head to slide along a toothed rack set along the Z axis).

This rotary spindle is equipped with the means for locking (not shown) the tool holder 14 gripping a tool 15.

Movable protective panels (not shown), possibly transparent, can cover, in general during machining operations, the openings provided in the sides 2 to 5.

Thanks to the hydraulic or pneumatic systems 28 and 19 (the third, hidden by the column 18 is not shown), the work tank 16 can slide downwards along column 18; the latter supports the work table designed to hold the workpiece (the workpiece and its clamping devices are not shown).

Figure 2:
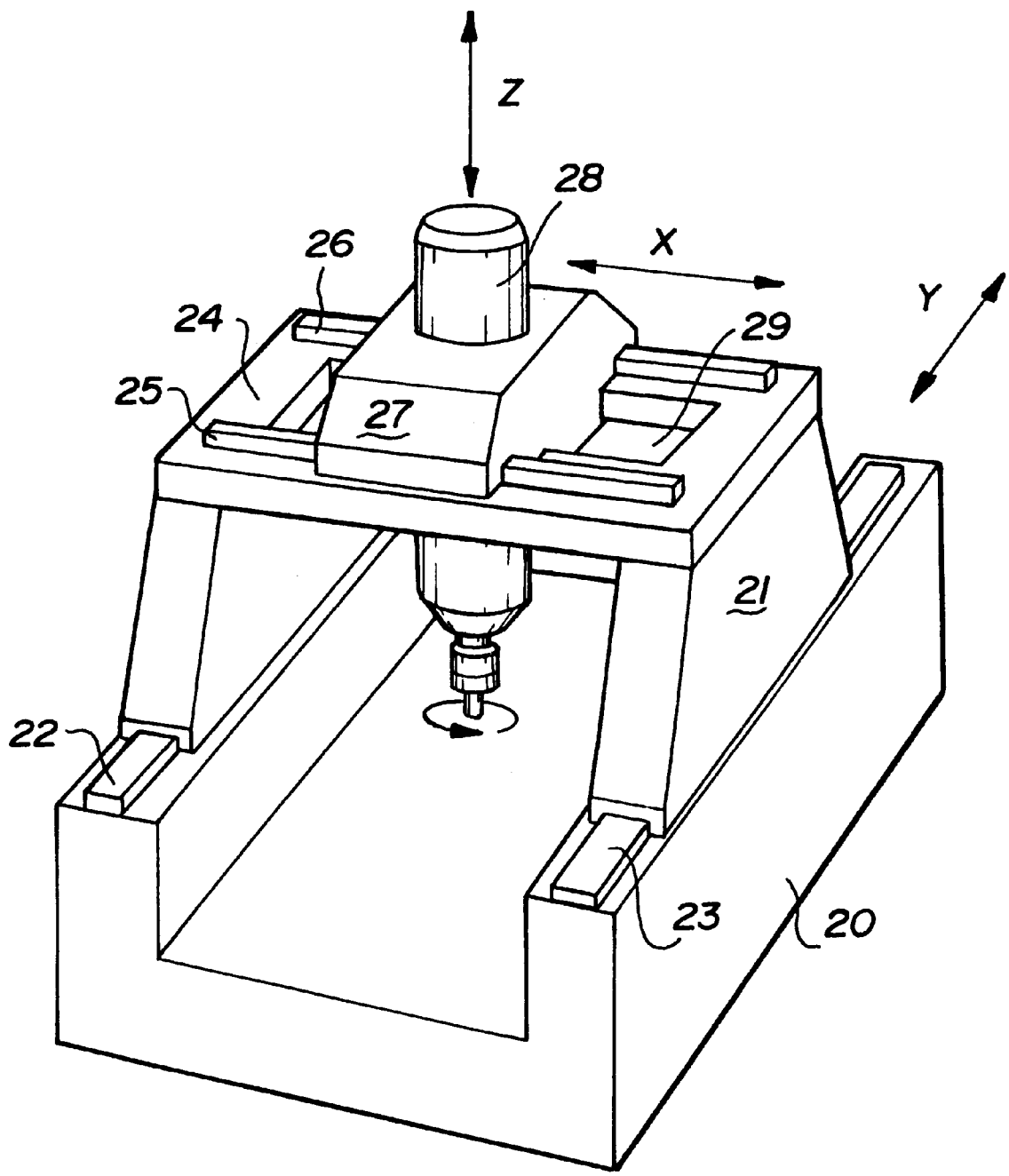

FIG. 2 is a simplified perspective view of the front face and one side of the main frame of another machine according to another embodiment of this invention; this main frame comprises a base 20 provided rails 22 and 23. on which slides the gantry 21 along the axis Y. The cross beam 24 of the gantry 21 is fitted with two rails 25 and 26 along which slides the chariot 27 along the axis X. This chariot 27 has a circle cut out and comprises means (not shown) for holding the cylindrical shaft 28 of the movement along the Z axis. The cross beam 24 has a space 29 suitably cut out to allow this shaft 28 to move freely along X, following the movements of the chariot 27.

I claim:

1. An electrical discharge machine for allowing machining of a stationary work piece with a high wear rate, comprising;

a rotating spindle fixed on a machine head of the machine and designed to rotate an electrode tool, a device for moving said machining head and hence said electrode tool along a Z axis, said device being mounted on a cross beam which is supported between two shoulders and defining therebetween a work area, a system with crossed movements comprising a first and second means for moving said machining head along X and Y axes and further comprising, a first means for actuating a first chariot to slide along a selected one of said X axis and a Y axis, said first actuating means being mounted on said cross beam, said first chariot being cut out at a central portion so as to allow a shaft mounted to said first chariot to pass through, said shaft having affixed to an end thereof said device for moving the machining head along said Z axis, and cross beam having an opening formed therein which is designed to enable said device to move according to the movements of said first chariot, a second means for actuating along the selected other of the X axis and Y axis either said cross beam or said device for moving the machining head along the Z axis, a work table for supporting said stationary work piece, said work table being supported atop a column mounted to a base of said machine, means for actuating said work table along the Z axis in cooperation with said device for moving said machining head along the Z axis, and said means for actuating said work table along the Z axis further comprising a pair of fluid actuators mounted to said base and contacting an underside of said column upon which said work table is mounted.

2. The electrical discharge machine according to claim 1, said second means for actuating further comprising a second chariot which actuates along the other of the X and Y axes and is mounted atop said first chariot, said device for creating movement of said machining head along the Z-axis crossing a superposition of said two chariots so that the Z axis is the same as a center of symmetry of at least one of said chariots, said device further maintaining a common point with a corresponding axis of said second chariot.

3. The electrical discharge machine according to claim 2, further comprising said cross beam remaining fixed in relation to a main frame of said machine.

4. The electrical discharge machine according to claim 3, further comprising said main frame forming a cube delimited by four vertical walls, said cross beam being hollowed out and supporting the assembly constituted by said first chariot traversed by said device for moving said machining head along the Z axis, said main frame being shaped substantially as a cube and said device resting upon four pillars forming edges of said cube, at least one of the four verticals wall being widely cut out so as to make the work area accessible.

5. The electrical discharge machine according to claim 1, said fluid actuators are a pair of hydraulically powered cylinders.

6. The electrical discharge machine according to claim 1, said fluid actuators are a pair of pneumatically powered cylinders.

7. The electrical discharge machine according to claim 1, further comprising a work tank mounted atop said work table within which said workpiece is secured.

8. An electrical discharge machine for allowing machining of a stationary work piece with a high wear rate, comprising;

a rotating spindle fixed on a machine head of the machine and designed to rotate an electrode tool, a device for moving said machining head and hence said electrode tool along a Z axis, said device being mounted on a cross beam which is supported between two shoulders and defining therebetween a work area, a system with crossed movements comprising a first and second means for moving said machining head along X and Y axes and further comprising, a first means for actuating a first chariot to slide along a selected one of said X axis and a Y axis, a shaft having affixed to an end thereof said device for moving the machining head along said Z axis, a second means for actuating along the selected other of the X axis and Y axis either said cross beam or said device for moving the machining head along the Z axis, a work table for supporting said stationary work piece, said work table being supported atop a column mounted to a base of said machine, means for actuating said work table along the Z axis in cooperation with said device for moving said machining head along the Z axis, and said means for actuating said work table along the Z axis further comprising a pair of fluid actuators mounted to said base and contacting an underside of said column upon which said work table is mounted.

9. The electrical discharge machine according to claim 8 and said second actuating means further comprising;

a second chariot which actuates along the other of said X and Y axes and is mounted atop said first chariot, said device for creating movement of said machining head along the Z axis crossing a superposition of said two chariots so that the Z axis is the same as the center of symmetry of at least one of said chariots, and said device further maintaining a common point with a corresponding axis of said second chariot.

10. The electrical discharge machine according to claim 8 and further comprising;

said machine including a main frame, and said cross beam being fixed in relation to said main frame of said machine.

11. The electrical discharge machine according to claim 10 and further comprising;

said main frame forming a cube delimited by four vertical walls, said cross beam being hollowed out and supporting the assembly constituted by said first chariot traversed by said device for moving said machining head along the Z axis, said main frame including four pillars forming the edges of said cube and said device resting upon said four pillars, and at least one of said four vertical walls being widely cut out so as to make said work area accessible.

* * * * *